(12) United States Patent
Marquardt et al.

(10) Patent No.: US 9,979,562 B2
(45) Date of Patent: May 22, 2018

(54) NETWORK FUNCTION VIRTUALIZATION REQUIREMENTS TO SERVICE A LONG TERM EVOLUTION (LTE) NETWORK

(71) Applicant: Sprint Communications Company L.P., Overland Park, KS (US)

(72) Inventors: Ronald R. Marquardt, Woodinville, WA (US); Lyle Walter Paczkowski, Mission Hills, KS (US); Arun Rajagopal, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 257 days.

(21) Appl. No.: 14/722,418

(22) Filed: May 27, 2015

(65) Prior Publication Data

US 2016/0352537 A1    Dec. 1, 2016

(51) Int. Cl.
| | | |
|---|---|---|
| *H04L 12/28* | (2006.01) | |
| *H04L 12/46* | (2006.01) | |
| *H04W 76/02* | (2009.01) | |
| *H04W 48/18* | (2009.01) | |
| *G06F 9/455* | (2018.01) | |
| *H04W 60/00* | (2009.01) | |

(52) U.S. Cl.
CPC ...... *H04L 12/4679* (2013.01); *G06F 9/45558* (2013.01); *H04W 48/18* (2013.01); *H04W 76/02* (2013.01); *G06F 2009/45595* (2013.01); *H04L 12/4641* (2013.01); *H04W 60/00* (2013.01)

(58) Field of Classification Search
CPC .... H04L 5/0057; H04L 49/15; H04W 52/346; H04W 72/0453
See application file for complete search history.

(56) References Cited

U.S. PATENT DOCUMENTS

| | | |
|---|---|---|
| 8,494,576 B1 | 7/2013 | Bye et al. |
| 8,504,097 B1 | 8/2013 | Cope et al. |
| 8,649,770 B1 | 2/2014 | Cope et al. |
| 8,667,607 B2 | 3/2014 | Paczkowski et al. |

(Continued)

FOREIGN PATENT DOCUMENTS

| | | |
|---|---|---|
| EP | 2866495 | 4/2015 |
| WO | 2014202151 | 12/2014 |
| WO | 2016073235 | 5/2016 |

OTHER PUBLICATIONS

Tarik Taleb, et al.; "Ease: EPC as a Service to Ease Mobile Core Network Deployment over Cloud;" IEEE Network; Mar./Apr. 2015; pp. 78-88; IEEE Service Center; New York, NY, U.S.A.

(Continued)

*Primary Examiner* — Alvin Zhu (57) ABSTRACT

A Long Term Evolution (LTE) User Equipment (UE) determines an enhanced communication requirement. In response, the LTE UE determines one or more Network Function Virtualization (NFV) requirements for an LTE network. The LTE UE wirelessly attaches to the LTE network. In response, LTE UE wirelessly transfers a first Non-Access Stratum (NAS) file indicating the NFV requirements to the LTE network. The LTE UE receives and processes a second NAS file from the LTE network to determine if the LTE network can service the NFV requirements. If the LTE network can service the NFV requirements, then LTE UE wirelessly exchanges data over the LTE network.

20 Claims, 8 Drawing Sheets

(56) References Cited

U.S. PATENT DOCUMENTS

| | | | |
|---|---|---|---|
| 8,752,160 B1 | 6/2014 | Delker et al. | |
| 8,819,447 B2 | 8/2014 | Shipley et al. | |
| 9,445,344 B1* | 9/2016 | Oroskar | H04W 40/02 |
| 2008/0032731 A1* | 2/2008 | Shen | H04W 52/346 |
| | | | 455/522 |
| 2010/0311401 A1 | 12/2010 | Oh et al. | |
| 2013/0044709 A1 | 2/2013 | Adjakple et al. | |
| 2013/0322443 A1 | 12/2013 | Dunbar et al. | |
| 2013/0345530 A1 | 12/2013 | McRoberts et al. | |
| 2014/0019578 A1* | 1/2014 | Lim | H04L 61/1511 |
| | | | 709/213 |
| 2014/0047548 A1 | 2/2014 | Bye et al. | |
| 2014/0181267 A1 | 6/2014 | Wadkins et al. | |
| 2014/0201374 A1 | 7/2014 | Ashwood-Smith et al. | |
| 2014/0229945 A1 | 8/2014 | Barkai et al. | |
| 2014/0241247 A1 | 8/2014 | Kempf et al. | |
| 2014/0259012 A1 | 9/2014 | Nandlall et al. | |
| 2014/0362775 A1 | 12/2014 | Steiner et al. | |
| 2015/0063166 A1 | 3/2015 | Sif et al. | |
| 2015/0103665 A1* | 4/2015 | Kaippallimalil | H04W 76/02 |
| | | | 370/235 |
| 2015/0172218 A1* | 6/2015 | Beshai | H04L 49/15 |
| | | | 370/401 |
| 2016/0100405 A1* | 4/2016 | Hunukumbure | H04W 72/0453 |
| | | | 455/452.1 |
| 2016/0135057 A1* | 5/2016 | Wang | H04L 5/0057 |
| | | | 455/454 |
| 2016/0197932 A1* | 7/2016 | Hoffman | H04L 63/102 |
| | | | 726/4 |
| 2016/0262021 A1* | 9/2016 | Lee | H04L 63/083 |
| 2016/0323845 A1* | 11/2016 | Kim | H04W 8/02 |
| 2017/0012898 A1* | 1/2017 | Zhu | H04L 12/6418 |

OTHER PUBLICATIONS

Mao Yang, et al.; "Software-Defined and Virtualized Future Mobile and Wireless Networks: A Survey;" Mobile Netw Appl 20:4-18, DOI 10.1007/s11036-014-0533-8; Sep. 18, 2014; pp. 4-18; Springer Science+Business Media; New York, NY, U.S.A.

* cited by examiner

NETWORK FUNCTION VIRTUALIZATION REQUIREMENTS TO SERVICE A LONG TERM EVOLUTION (LTE) NETWORK

TECHNICAL BACKGROUND

Internet Protocol (IP) communication systems transfer IP packets among user devices and intelligent machines to provide data communication services like internet access, file transfers, media streaming, and user messaging. The IP communication systems are implementing several technologies in a contemporaneous manner to improve service delivery. These technologies include systems for Hardware Root of Trust (HRoT) and Network Function Virtualization (NFV) to improve service quality.

NFV servers process virtual machines that operate as communication network elements such as gateways, controllers, databases, and the like. The NFV servers exchange data packets with other network elements like Ethernet switches and IP routers to support data services like mobile internet access, user messaging, and media transfers. The NFV servers implement hypervisors and context switching to operate in a time-sliced manner. The NFV servers typically separate different virtual networks and/or services in the different NFV time slices.

Protected data systems may be accessed by user devices over wireless communication networks, such as Wireless Fidelity (WIFI) and Long Term Evolution (LTE) networks. Different protected data systems may be dedicated to specific networks elements. Thus, Virtual Private Networks (VPNs) are typically deployed for protected data systems using specific NFV hardware components, such as data center sites, server blades, central processing units (CPUs), cores, time slices, memories, transceivers, and the like. Therefore, a user device may be required to connect to a trusted network using private NFV requirements before exchanging data with a protected data system. Unfortunately, there is not an effective or efficient method for the user device to determine if a network can service NFV requirements.

TECHNICAL OVERVIEW

A Long Term Evolution (LTE) User Equipment (UE) determines an enhanced communication requirement. In response, the LTE UE determines one or more Network Function Virtualization (NFV) requirements for an LTE network. The LTE UE wirelessly attaches to the LTE network. In response, LTE UE wirelessly transfers a first Non-Access Stratum (NAS) file indicating the NFV requirements to the LTE network. The LTE UE receives and processes a second NAS file from the LTE network to determine if the LTE network can service the NFV requirements. If the LTE network can service the NFV requirements, then LTE UE wirelessly exchanges data over the LTE network.

DETAILED DESCRIPTION

Figure 1:
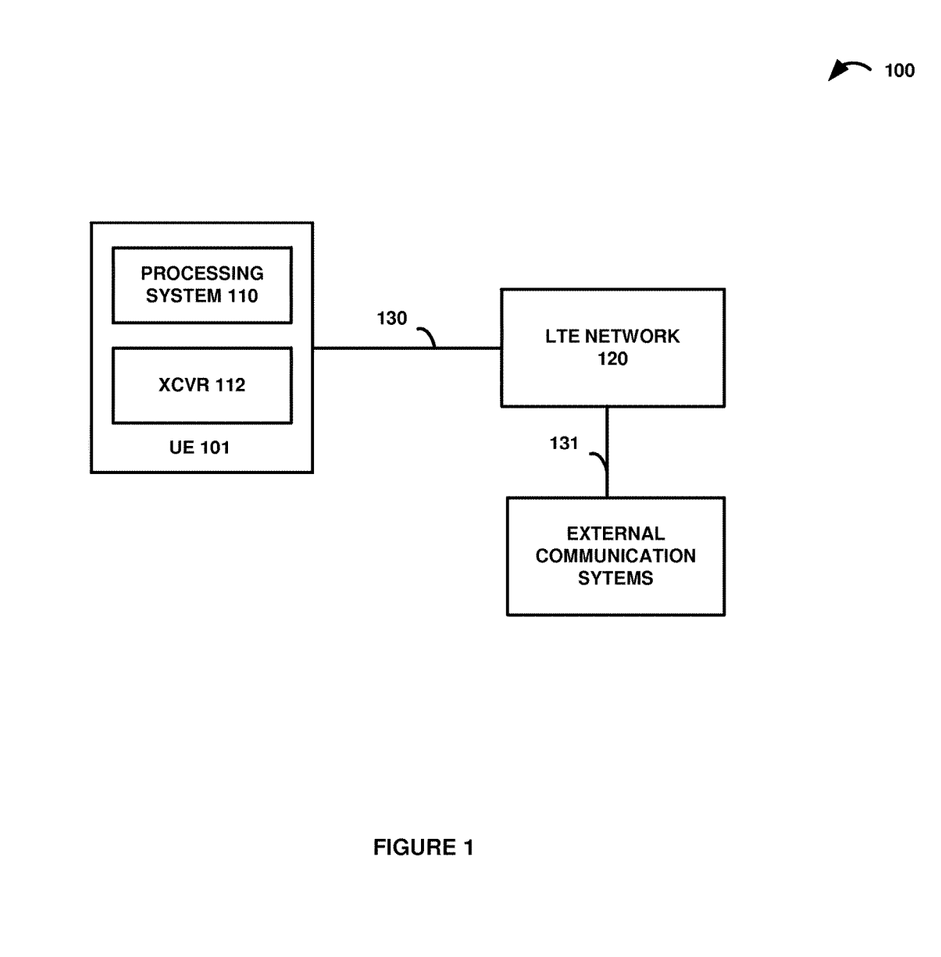
FIGS. 1-3 illustrate a Long Term Evolution (LTE) communication system 100 to determine if an LTE network can service Network Function Virtualization (NFV) requirements for a User Equipment (UE).
Figure 2:
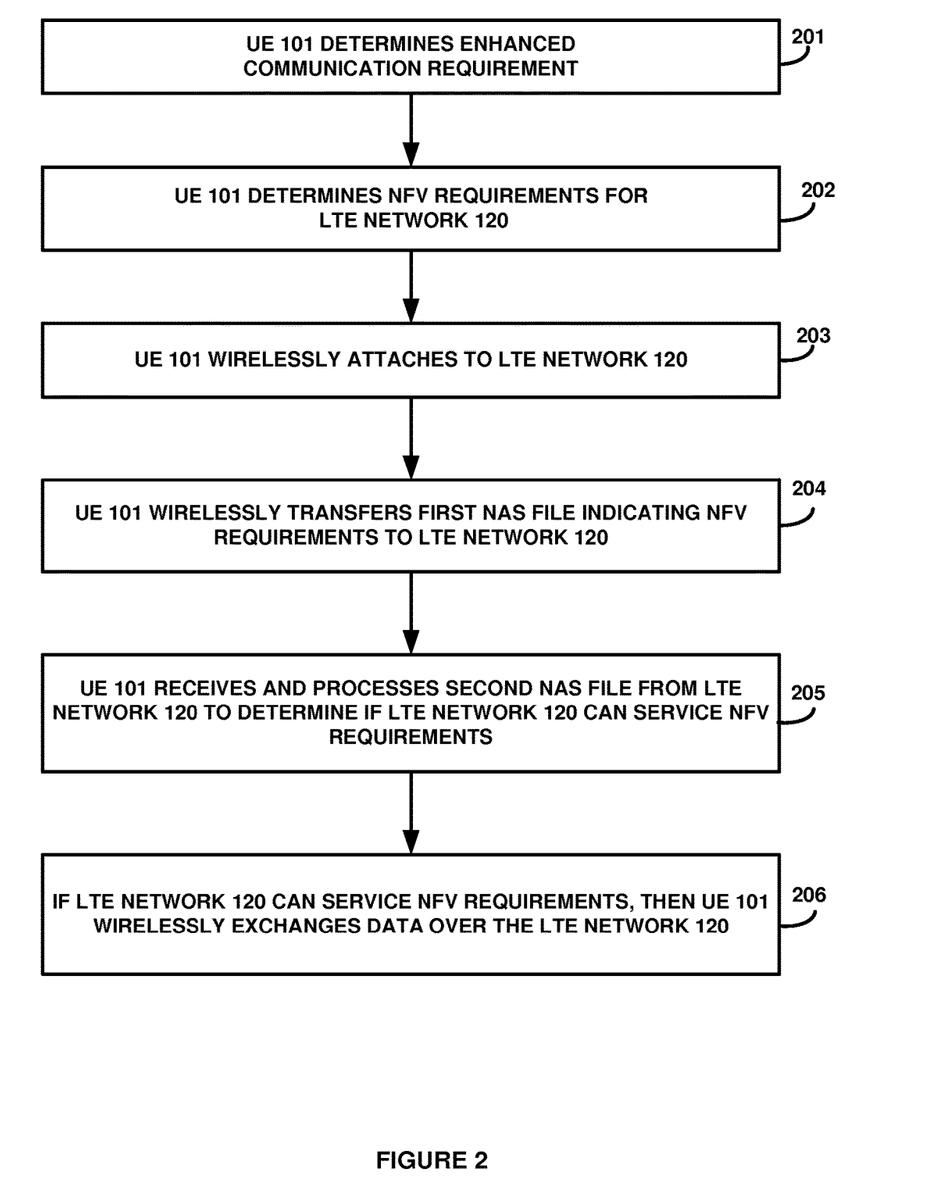
Figure 3:
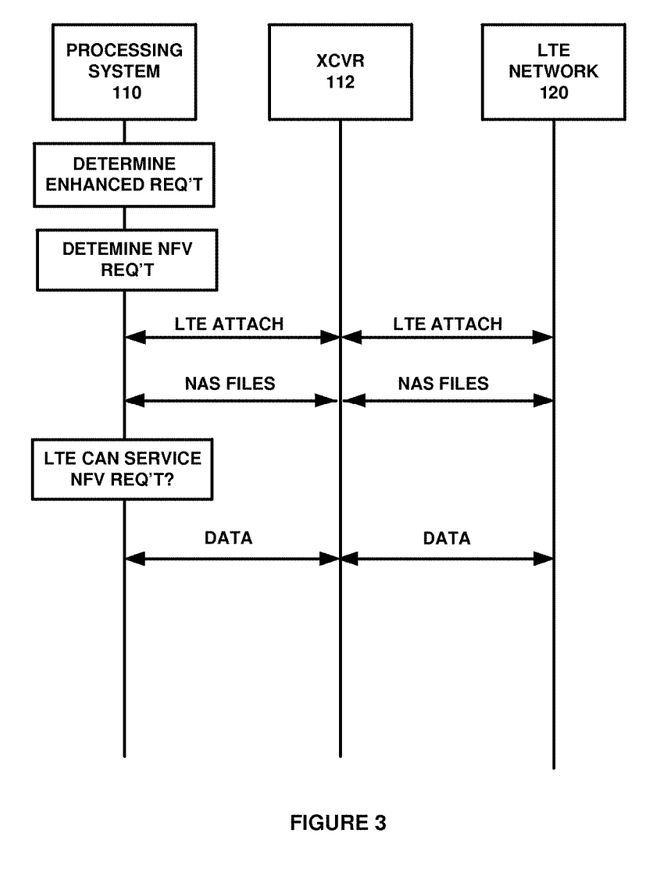

FIGS. 1-3 illustrate communication system 100 to determine if Long Term Evolution (LTE) network 120 can service Network Function Virtualization (NFV) requirements for User Equipment (UE) 101. LTE communication system 100 includes UE 101, LTE network 120, wireless communication links 130-131, and external communication systems. UE 101 includes data processing system 110 and wireless communication transceiver 112. UE 101 and LTE network 120 communicate over wireless communication link 130. LTE network 120 and external communication systems communicate over wireless communication link 131.

UE 101 could be a phone, tablet computer, media device, or some other apparatus having a wireless LTE transceiver. UE 101 includes processing circuitry and memory that store and execute various software modules. UE 101 comprises communication transceivers, such as antennas, ports, bus interfaces, signal processors, memory, and software.

Data processing system 110 may include general purpose central processing units, microprocessors, application specific processors, logic devices, and any other type of processing device. Wireless communication transceiver 112 comprises communication components, such as antennas, ports, amplifiers, filters, modulators, signal processors, and the like.

LTE network 120 transfers data between UE 101 and external communication systems, such as Internet, virtual networks, protected data systems, and other external systems. LTE network 120 comprises network elements, such as access nodes, management nodes, gateway systems, or other data communication network elements—including combinations thereof. LTE network 120 may also include other components, such as a router, server, data storage system, and power supply. LTE network 120 may reside in a single device or may be distributed across multiple devices.

In operation, UE 101 determines an enhanced communication requirement. The enhanced communication requirement may be detected by an application operating on UE 101. In particular, an enhanced communication requirement would typically be an alert to UE 101 that UE 101 must attach to trusted LTE network 120 before connecting to or exchanging information with a protected database system. For example, UE 101 may be required to attach to LTE network 120 before seeing medical records or patient billing information from a healthcare database. Another example would be UE 101 logging into a bank webpage which requires UE 101 to attach to LTE network 120 before entering a secure pin code or password.

UE 101 may also determine an enhanced communication requirement based on the location of UE 101, or based on the increased signal strength of LTE network 120 or decreased signal strength of the network UE 101 is currently attached to. For example, as UE 101 moves closer to a place of employment requiring use of LTE network 120, and further from home where the employee may use a Wireless Fidelity (WIFI) network, UE 101 would determine to switch from the WIFI network to LTE network 120. UE 101 may also determine an enhanced communication requirement based on time-of-day, such as using LTE network 120 during normal working hours or times that the user of UE 101 is on call or working a shift. For example, a corporate employee may be required to use trusted LTE network 120 to see private corporate information on a corporate database system during working hours. It should be noted that other enhanced communication requirements could be used to trigger the need for attachment to trusted LTE network 120.

In response to UE 101 determining an enhanced communication requirement, UE 101 determines one or more NFV requirements for LTE network 120. The NFV requirements may be determined based on programmed instructions in UE 101, based on a requirement for LTE attachment from a database or server system, or some other indication for UE 101.

NFV requirements typically include trusted data centers, servers, server blades, central processing units (CPUs), cores, time slices, data memories, transceivers, and other NFV associated trusted hardware elements. For example, a corporate employee data system may require UE 101 to attach to trusted LTE network 120 using data center 4, server blade 1, and port 23. NFV requirements may also include Network Identifiers (NIDs), carrier frequencies, subcarrier frequencies or channels, Access Point Names (APNs), and LTE network elements such as evolved NodeBs (eNodeBs), Packet Data Network Gatways (P-GWs), Serving Gateways (S-GWs), Mobility Management Entities (MMEs), or other network elements—including combinations thereof. For example, a mobile bank login on an application of UE 101 may require UE 101 to attach to trusted LTE network 120 using a private eNodeB, P-GW, and MME. NFV requirements could also be requirements for the eNodeB to implement, such as enabling or disabling LTE Carrier Aggregation (CA) or Multiple-Input and Multiple-Output (MIMO).

In a next operation, UE 101 wirelessly attaches to LTE network 120. In response, UE 101 wirelessly transfers a first Non-Access Stratum (NAS) file indicating the NFV requirements to LTE network 120. In particular, UE 101 detects an eNodeB base station and responsively exchanges Radio Resource Configuration (RRC) signaling with the eNodeB. The eNodeB then transfers an S1-Application Protocol (S1-AP) message to a Mobility Management Entity (MME). The S1-AP message contains the NAS file indicating the NFV requirements.

The MME would then typically transfer a Diameter request message to a Home Subscriber System (HSS) which processes data for UE 101 and information in the first NAS file indicating the NFV requirements. The HSS may process information relating to subscriber profiles, user authorization, and subscriber location and IP information. The HSS would then transfer a Diameter response to the MME indicating the data and first NAS file information. For example, the MME may send a request message containing the NAS file to the HSS and the HSS may process the data for UE 101 to select an APN and transfer a Diameter response to the MME indicating the APN and associated APN information.

The MME could then process the APN and associated APN information to determine if the NFV required eNodeB, a P-GW, and a carrier frequency are implemented. This information would then be sent to the P-GW via the S-GW to generate an S5 General Packet Radio Service Transfer Protocol (GTP) message indicating the IP address for UE 101 which is then sent back to the MME via the S-GW. The MME processes this information to generate and transfer an S1-AP message to the eNodeB indicating IP address and other UE associated information. The eNodeB would then generate and transfer an RRC message to UE 101 indicating the IP address, default bearer, and NAS information.

In a next operation, UE 101 receives and processes a second NAS file from LTE network 120 to determine if LTE network 120 can service the NFV requirements. If LTE network 120 can service the NFV requirements, then UE 101 wirelessly exchanges data over LTE network 120. For example, if UE 101 indicated in the first NAS file that attachment to trusted LTE network 120 for a corporation required use of private data center 4, server blade 1, and port 23, and the second NAS file indicated that the LTE network was able to use those NFV requirements, then UE 101 would be able exchange data with the corporate employee data system over LTE network 120. However, if the second NAS file indicated that the LTE network was only able to use port 24 and not port 23 as required for LTE network 120, then UE 101 would be denied access to the corporate data system. This ensures that protected or confidential information is not seen or exchanged unless UE 101 is attached to trusted LTE network 120 over the required NFV elements.

In some examples, UE 101 transfers an establishment cause indicating that the NAS file will indicate the NFV requirements. The establishment cause is typically transferred in the RRC message which may be processed in the eNodeB. In particular, the establishment cause would not generally contain enough data to indicate the NFV requirements, but may be able to indicate that the NAS file will contain NFV requirements for LTE attachment. For example, the establishment cause may use a code to notify the MME that a NAS file will be transferred and contains NFV requirements for the MME to use for LTE attachment.

In some examples, the NFV requirements indicate an NFV APN, and UE 101 wirelessly exchanges the data using the NFV APN. In particular, the APN identifies the packet data network (PDN) and defines a type of service. In this example, the APN could also be used to tell an MME requirements for the eNodeB, P-GW, S-GW, carrier frequency, subcarrier frequency, and other NFV requirement information for LTE network 120.

In some examples, the NFV requirements indicate an NFV data center. For example, the NFV requirement may require LTE attachment using data center 8, a data center at the same site as a protected data system, or a data center in the United States. In other examples, the NFV requirements indicate an NFV server blade and UE 101 wirelessly exchanges the data using the NFV server blade. For example, the NFV requirement may require LTE attachment using server blade A-1 on server 6. The server blade may be determined and located by a hypervisor on a virtual machine using the APN.

In some examples, the NFV requirements indicate an NFV time slice and UE 101 wirelessly exchanges the data using the NFV time slice. The NFV time slice is the period of time a process is allowed to run in a preemptive multitasking system. For example, a scheduler may be run for a different process in each time slice with an interrupt scheduled in between processes to allow the kernel to clear the NFV system and switch to the next process. In other examples, the NFV requirements indicate an NFV memory block and UE 101 wirelessly exchanges the data using the NFV memory block.

In some examples, UE 101 determines at least one trusted LTE eNodeB. In particular, the trusted eNodeB may be selected based on prior programming in UE 101, based on an APN in a NAS file, or based on a specific NFV requirement in the NAS file. The eNodeB may be specifically required or selected from a set of trusted eNodeBs. The eNodeB may be located in an NFV server for the protected data system in LTE network 120, in another NFV server that communicates with the NFV server for the protected data system in LTE network 120, or located outside of the NFV server. In this example, UE 101 attaches to at least one trusted LTE eNodeB responsive to the enhanced communication requirement. For example, UE 101 may be programmed to attach to eNodeB 1 when attaching to LTE network 120 during normal working hours.

In some examples, UE 101 determines at least one trusted LTE carrier frequency. In this example, UE 101 attaches to LTE network 120 using the at least one trusted LTE carrier frequency responsive to the enhanced communication requirement. In other examples, UE 101 determines at least one trusted LTE subcarrier frequency. In this example, UE 101 attaches to LTE network 120 using the at least one trusted LTE subcarrier frequency responsive to the enhanced communication requirement.

FIG. 2 is a flow diagram illustrating an operation of communication system 100 to determine if LTE network 120 can service NFV requirements for UE 101. UE 101 determines (201) an enhanced communication requirement. In response, UE 101 determines (202) one or more NFV requirements for LTE network 120. UE 101 wirelessly attaches (203) to LTE network 120. In response, UE 101 wirelessly transfers (204) a first NAS file indicating the NFV requirements to LTE Network 120. UE 101 receives and processes (205) a second NAS file from LTE network 120 to determine if LTE network 120 can service the NFV requirements. If LTE network 120 can service the NFV requirements, then UE 101 wirelessly exchanges (206) data over LTE network 120.

FIG. 3 is a sequence diagram illustrating the operation of communication system 100 to determine if LTE network 120 can service NFV requirements for UE 101. Data processing system 110 determines an enhanced communication requirement. In response, data processing system 110 determines one or more NFV requirements for LTE network 120 and drives wireless communication transceiver 112 to wirelessly attach to LTE network 120. Wireless communication transceiver 112 transfers and receives NAS files indicating NFV requirements to and from LTE network 120. Data processing system 110 then receives the NAS file transferred by wireless communication transceiver 112 from LTE network 120 and in response, processes the NAS file to determine if LTE network 120 can service the NFV requirements. Data processing system 112 then directs wireless communication transceiver 112 to wirelessly exchange data over LTE network 120 to external communication systems if LTE network 120 can service the NFV requirements.

Figure 4:
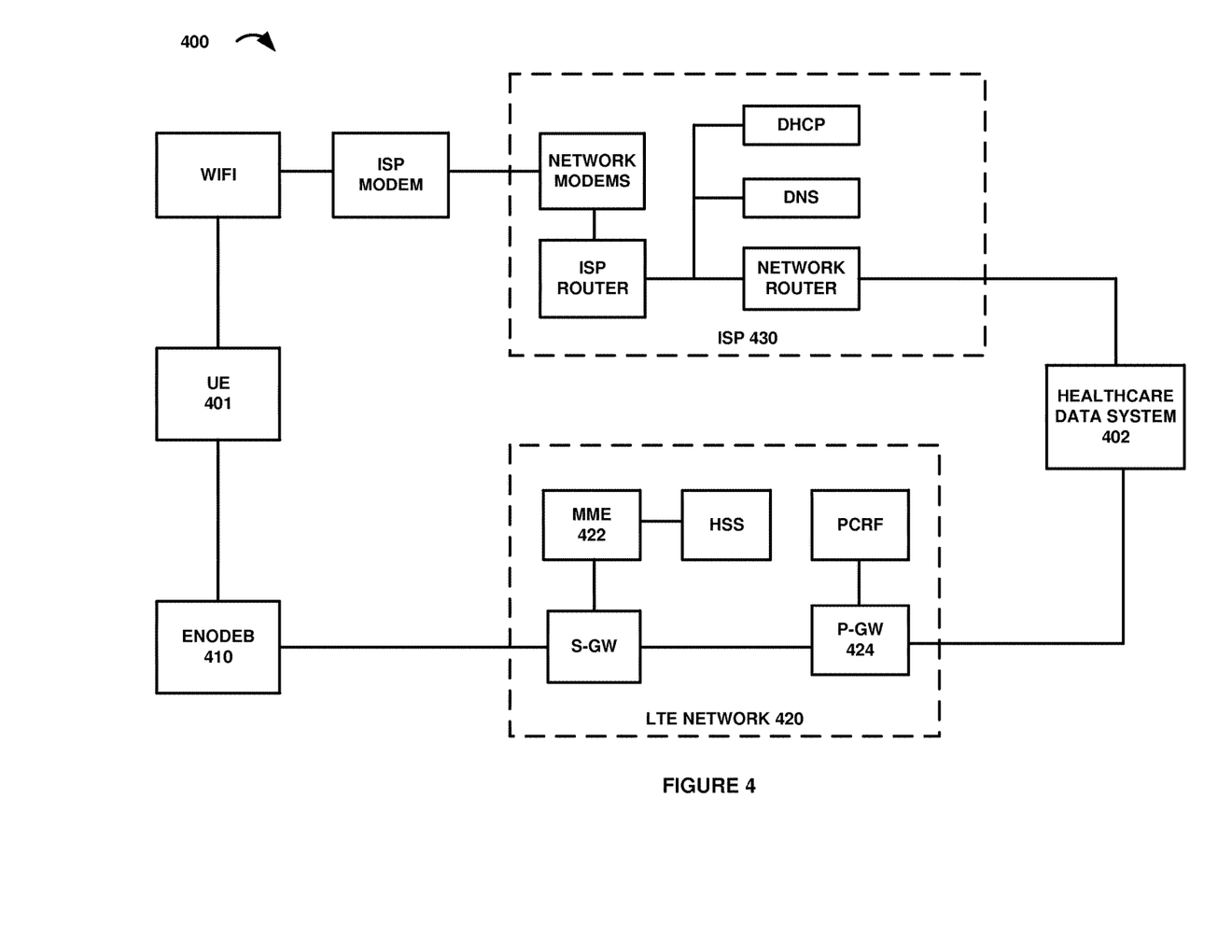
FIGS. 4-5 illustrate an LTE communication system to determine if an LTE network can service NFV requirements for a UE.
Figure 5:
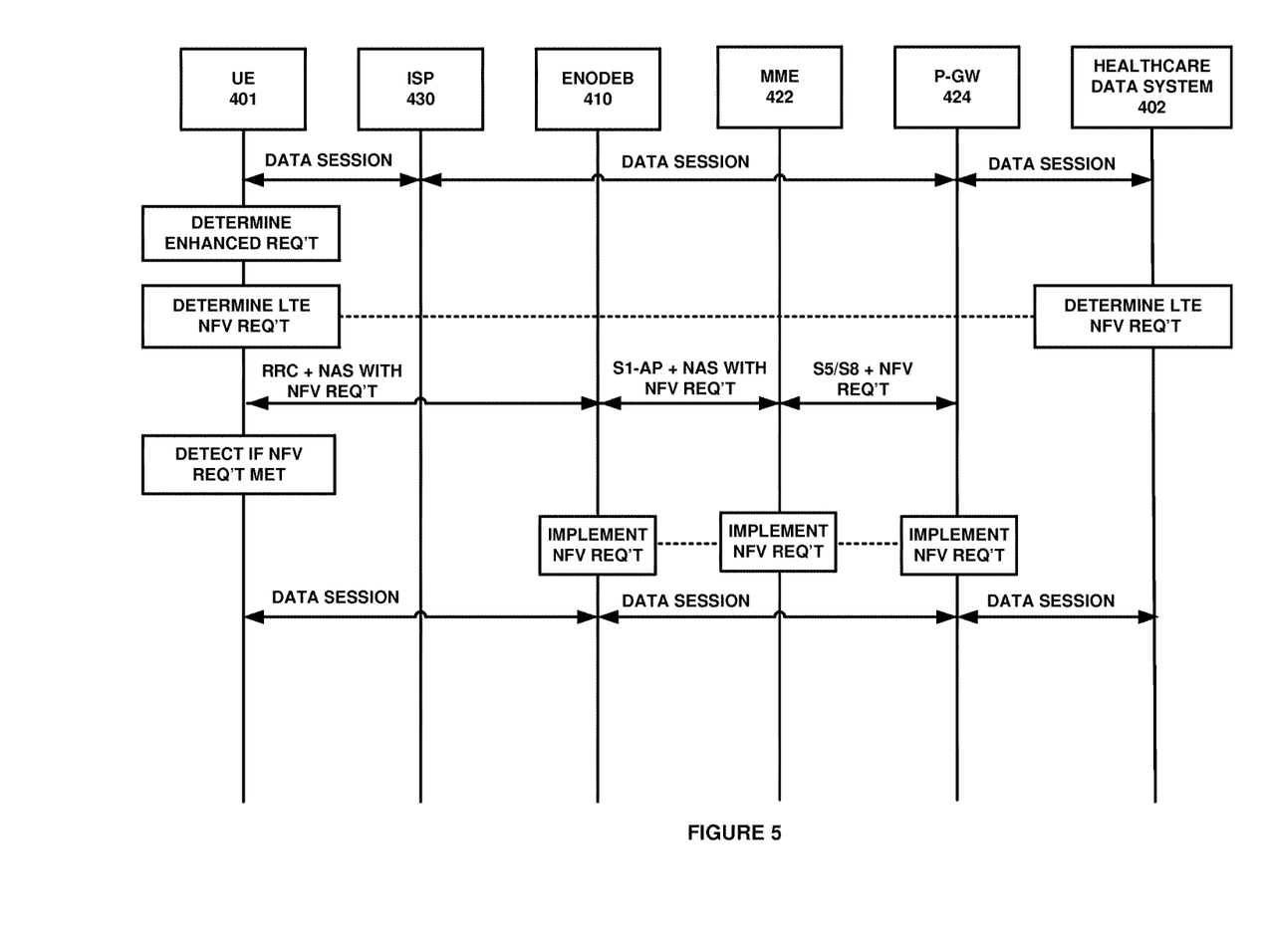

FIGS. 4-5 illustrate communication system 400 to determine if an LTE network can service NFV requirements for UE. LTE communication system 400 is an example of communication system 100, although communication system 100 may use alternative configurations and operations. Communication system 400 includes UE 401, healthcare data system 402, LTE network 420, and Internet Service Provider (ISP) 430. UE 401 and LTE network 420 communicate using eNodeB 410. UE 401 and ISP 430 communicate over WIFI network and ISP modems. LTE network 420 comprises network elements S-GW, MME 422, HSS, P-GW 424, and PCRF. ISP 430 comprises network modems, IPS router, Dynamic Host Configuration Protocol (DHCP), Domain Name System (DNS), and network router.

Referring to FIG. 5, UE 401 exchanges data with healthcare data system 402 over ISP 430. For example, a patient may open a healthcare mobile application on a smartphone and search for public data in healthcare data system 402, such as the medical records department hours of operation or a physician's telephone number.

In a next operation, UE 401 and healthcare data system 402 determine an enhanced communication requirement. For example, the patient may request to view their medical records, pay an online bill, or update contact information. The enhanced communication requirement may also be determined by the application for UE 401 prompting the patient to enter a password or secure pin.

In response, UE 401 determines NFV requirements for LTE network 420. In this example embodiment, the NFV requirements may be negotiated between UE 401 and healthcare data system 402 over ISP 430 prior to LTE attachment. NFV requirements include a trusted data center, server blade, core, time slice, data memory, and port. NFV requirements also include NIDs, carrier frequencies, subcarrier frequencies or channels, APNs, and LTE network components such as eNodeB 410, P-GW 424, S-GW, and MME 422. In this example, NFV requirements are also that eNodeB 410 must enable LTE CA and MIMO. If any of the NFV requirements cannot be serviced by LTE network 420, UE 401 will be denied access to the private medical data.

UE 401 then wirelessly attaches to LTE network 420 and transfers a NAS file indicating NFV requirements via eNodeB 410, MME 422, and P-GW 424. UE 401 and eNodeB 410 exchange RRC signaling messages with NAS files indicating the NFV requirements. The RRC signaling message include an establishment cause indicating that the NAS file will indicate NFV requirements. eNodeB 410 and MME 422 exchange S1-AP signaling messages with NAS files indicating the NFV requirements. MME 422 and P-GW 424 exchange S5 or S8 signaling messages with NAS files indicating the NFV requirements.

In response, UE 401 receives and processes a NAS file from LTE network 420 to determine if LTE network 420 can service the NFV requirements. As indicated in FIG. 5, eNodeB 410, MME 422, and P-GW 424 implement the NFV requirements. For example, MME 422 may use the NAS file to determine a trusted P-GW and set of trusted eNodeBs and select P-GW 424 and eNodeB 410 based on the NAS file indications. MME 422 can also determine which carrier frequency and subcarrier frequency to implement based on the NAS file indications. Although not shown in FIG. 5, MME 422 may also query a database containing information from NFV server system components to determine locations of the NFV required data center, server blade, and memory block.

If LTE network 420 can service the NFV requirements, then UE 401 wirelessly exchanges data with healthcare data system 402 over LTE network 420 via eNodeB 410 and P-GW 424. For example, a patient using a healthcare data application on UE 401 will only be able to view their medical record and/or enter a password if their smartphone has been properly attached to LTE network 420 using the required APN, data center, server blade, core, memory, carrier frequency, subcarrier frequency, P-GW, and a trusted eNodeB from the set of trusted eNodeBs. After the data exchange requiring trusted LTE network 420 has been completed, UE 401 may return to ISP 430 to wirelessly exchange data with healthcare data system 402.

Note that healthcare data system 402 exchanges data with UE 401 only if the end-to-end communication path has met the NFV requirements. If LTE network 420 cannot service any of the NFV requirements, the medical records will not be available to UE 401 from healthcare data system 402 and/or the password cannot be entered since the LTE connection is not secure. This ensures that the confidential data in the medical records from healthcare data system 402 and passwords from UE 401 will not be transferred using non-trusted NFV components.

Figure 6:
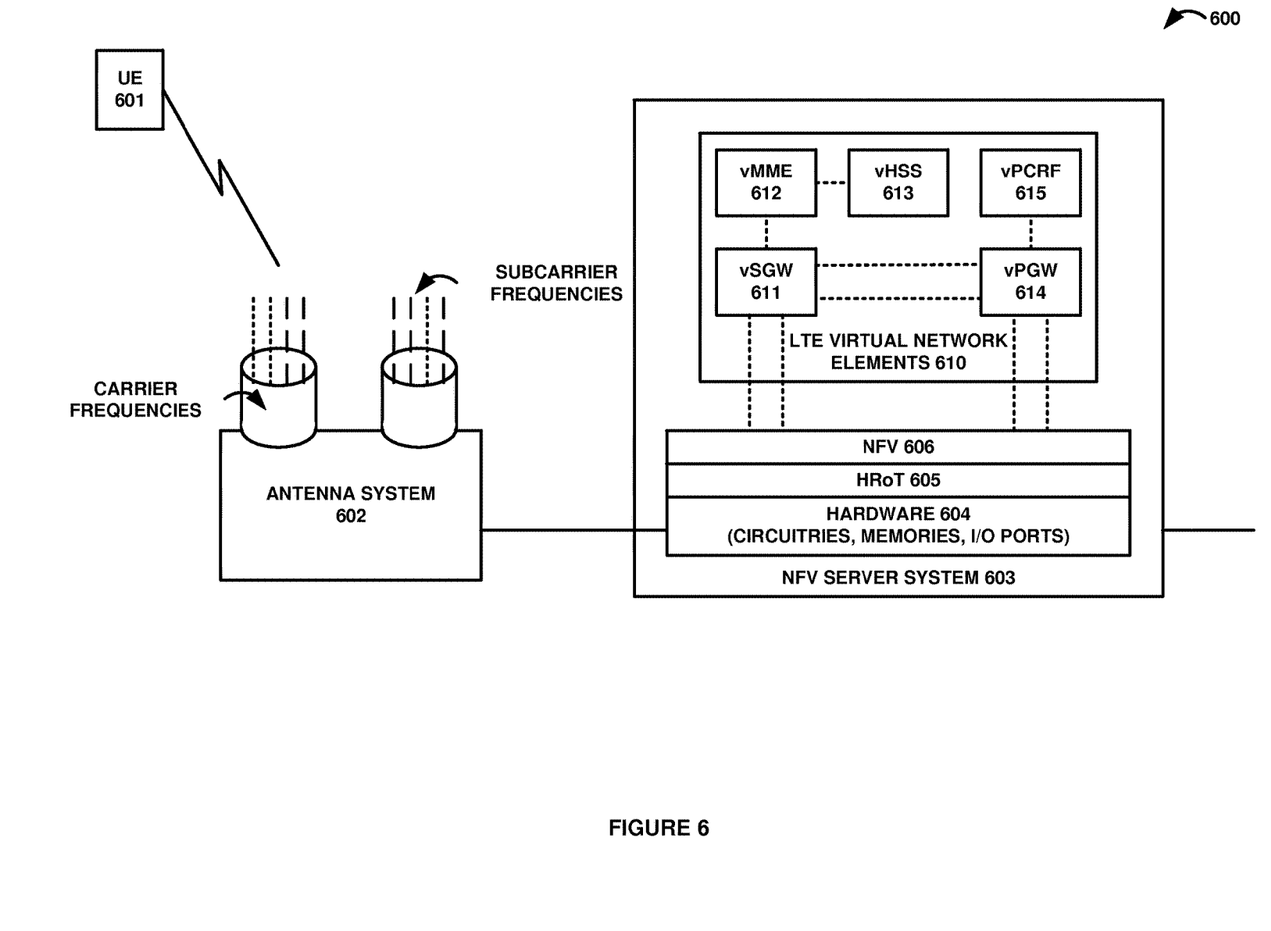
FIGS. 6-7 illustrate an NFV communication system to determine if an LTE network can service NFV requirements for a UE.
Figure 7:
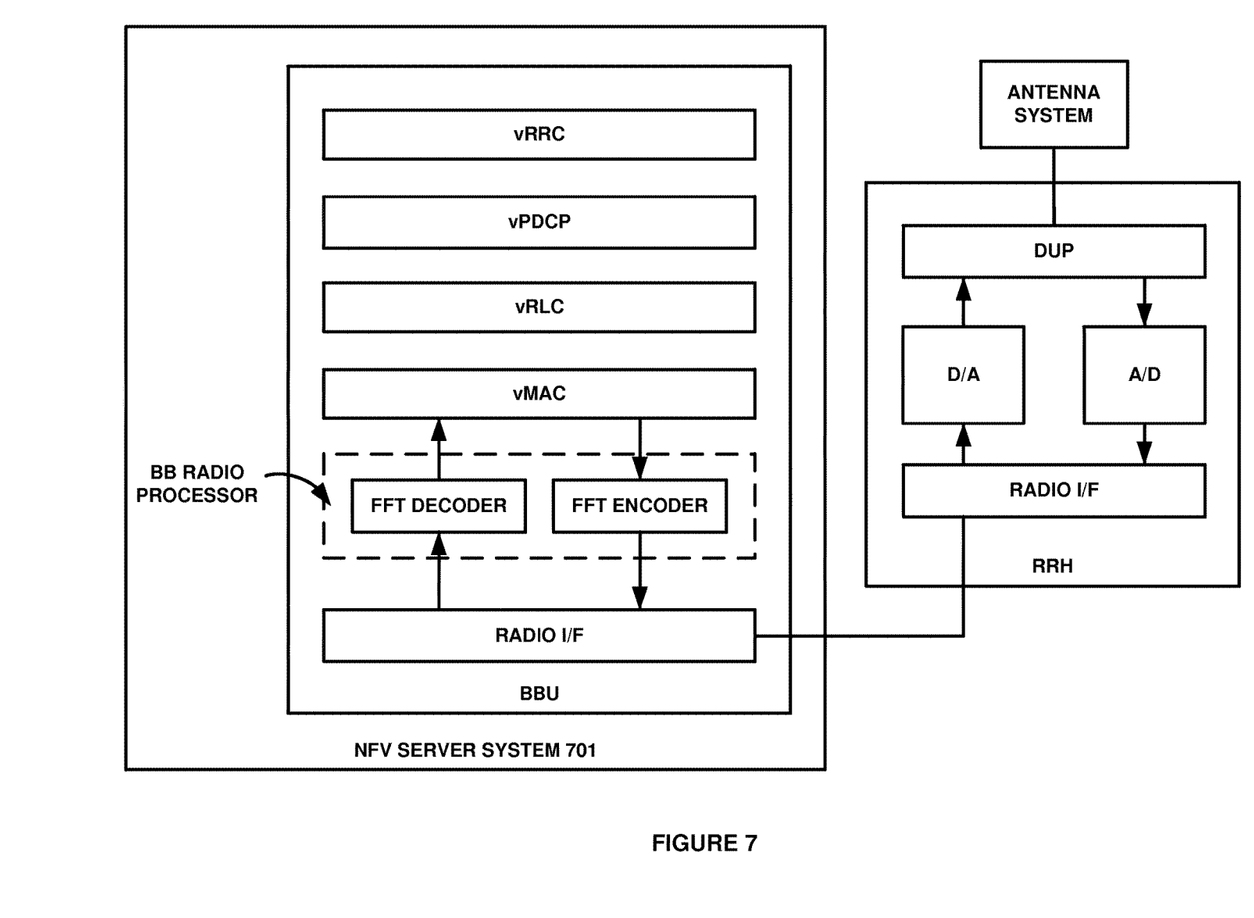

FIGS. 6-7 illustrate NFV communication system 600 to determine if an LTE network can service NFV requirements for UE. NFV communication system 600 is an example of communication systems 100 and 400, although systems 100 and 400 may vary from the specific details of this example. NFV communication system 600 comprises UE 601, antenna system 602, and NFV server system 603. NFV server system 603 comprises hardware 604, H) 605, NFV system 606, and LTE virtual network elements 610. Hardware 604 comprises data processing circuitries, memory devices, and Input/Output (I/O) communication interfaces. Antenna system 602 and NFV server system 603 communicate over communication links to exchange IP packets.

HRoT 605 comprises trust software and portions of hardware 604 to control access to and provide remote hardware verification for hardware 604. NFV system 606 comprises hypervisor software and portions of hardware 604 to execute virtual network elements 610 in virtual NFV time slices. LTE virtual network elements 610 include virtual S-GW (vS-GW) 611, virtual MME (vMME) 612, virtual HSS (vHSS) 613, virtual P-GW (vP-GW) 614, and virtual Policy Charging and Rules Function (vPCRF) 615.

Antenna system 602 includes communication components, such as antennas, ports, amplifiers, filters, modulators, signal processors, and the like. Antenna system 602 also includes microprocessors and other circuitry that retrieves and executes software from memory devices. Antenna system 602 could be a base station, such as an eNodeB or virtual eNodeB to transfer communication messages between UE 601 and NFV server system 603 using RRC, Radio Link Control (RLC), and the like. Antenna system 602 includes transceivers that communicate using specified carrier frequencies and subcarrier frequencies.

Referring to FIG. 7, NFV server system 701 includes a Baseband Unit (BBU) which communicates with a Remote Radio Head (RRH). The RRH and BBU contain radio interfaces that may be connected using lossless optical fibers. The RRH and BBU may be separated by a considerable distance to provide system deployment flexibility. The RRH communicates with an antenna system which receives data over carrier frequencies and subcarrier frequencies. RRH includes algorithms for digital-to-analog (D/A) and analog-to-digital (A/D) converting. The BBU contains a physical layer which may perform computational tasks, such as Fast Fourier Transform (FFT) encoder and FFT decoder for time/frequency channel coding and decoding. The BBU also contains layers for virtual RRC (vRRC), virtual Packet Data Convergence Protocol (vPDCP), virtual RLC (vRLC), and virtual Media Access Control (vMAC).

Figure 8:
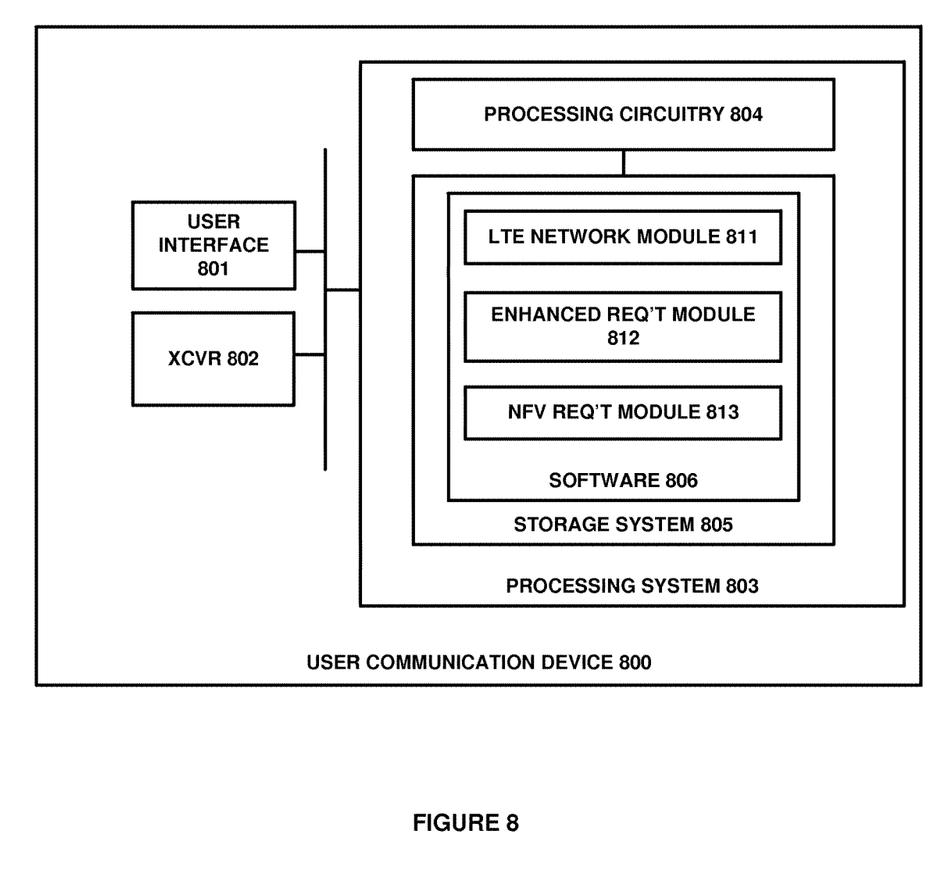
FIG. 8 illustrates an LTE UE to determine if an LTE network can service NFV requirements for the UE.

FIG. 8 illustrates UE 800 to determine if an LTE network can service NFV requirements for the UE. UE 800 is an example of UE 101 and UE 401, although UE 101 and UE 401 may use alternative configurations and operations. UE 800 includes user interface 801, transceiver 802, and processing system 803. Processing system 803 is linked to user interface 801 and transceiver 802.

User interface 801 comprises components that interact with a user such as a keyboard, display screen, microphone, touch pad, or some other user input/output apparatus. Transceiver 802 comprises communication components, such as antennas, ports, amplifiers, filters, modulators, signal processors, and the like. Transceiver 802 wirelessly attaches to an LTE network. Transceiver 802 wirelessly transfers and receives NAS files indicating NFV requirements for an LTE network. Transceiver 802 also wirelessly exchanges data over an LTE network if the LTE network can service the NFV requirements.

Processing system 803 includes processing circuitry 804 and storage system 805 that stores software 806. Processing circuitry 804 comprises a microprocessor and other circuitry that retrieves and executes software 806 from storage system 805. Storage system 805 comprises a non-transitory storage medium, such as a disk drive, flash drive, data storage circuitry, or some other memory apparatus. Software 806 comprises computer programs, firmware, or some other form of machine-readable processing instructions. Software 806 includes LTE network module 807, enhanced communication requirement module 808, and NFV requirement module 809. Software 806 may further include an operating system, utilities, drivers, network interfaces, applications, or some other type of software. When executed by processing circuitry 804, software 806 directs processing system 803 to operate user communication device 800 as described herein. Processing system 803 determines an enhanced communication requirement. Processing system 803 determines NFV requirements for the LTE network and processes NAS files to determine if the LTE network can service the NFV requirements.

In particular, when executed by processing circuitry 804, LTE network module 807 directs processing circuitry 804 to attach to a trusted LTE network. When executed by processing circuitry 804, LTE network module 807 also directs processing circuitry 804 to wirelessly transfer NAS files and receive NAS files indicating NFV requirements from the LTE network. When executed by processing circuitry 804, LTE network module 807 also directs processing circuitry 804 to exchange data with external communication systems using an LTE network. When executed by processing circuitry 804, enhanced communication requirement module 808 directs processing circuitry 804 to determine an enhanced communication requirement to use an LTE network to communicate data. When executed by processing circuitry 804, NFV requirement module 809 directs processing circuitry 804 to determine one or more NFV requirements for an LTE network. When executed by processing circuitry 804, NFV requirement module 809 also directs processing circuitry 804 to process the NAS files received from the LTE network. When executed by processing circuitry 804, NFV requirement module 809 also directs processing circuitry 804 to determine if the LTE network can service the NFV requirements.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a Long Term Evolution (LTE) User Equipment (UE) comprising:
   determining an enhanced communication requirement, and in response, determining one or more Network Function Virtualization (NFV) requirements for an LTE network;

wirelessly attaching to the LTE network, and in response, wirelessly transferring a first Non-Access Stratum (NAS) file indicating the NFV requirements to a Mobility Management Entity (MME) in the LTE network;

receiving and processing a second NAS file from the MME in the LTE network to determine if the LTE network can service the NFV requirements, and if the LTE network can service the NFV requirements, then wirelessly exchanging data over the LTE network.

2. The method of claim 1 wherein wirelessly attaching to the LTE network comprises transferring an establishment cause indicating that the NAS file will indicate the NFV requirements.

3. The method of claim 1 wherein the NFV requirements indicate an NFV Access Point Name (APN) and wherein wirelessly exchanging the data over the LTE network comprises wirelessly exchanging the data using on the NFV APN.

4. The method of claim 1 wherein the NFV requirements indicate an NFV data center and wherein wirelessly exchanging the data over the LTE network comprises wirelessly exchanging the data using on the NFV data center.

5. The method of claim 1 wherein the NFV requirements indicate an NFV server blade and wherein wirelessly exchanging the data over the LTE network comprises wirelessly exchanging the data using on the NFV server blade.

6. The method of claim 1 wherein the NFV requirements indicate an NFV time slice and wherein wirelessly exchanging the data over the LTE network comprises wirelessly exchanging the data using on the NFV time slice.

7. The method of claim 1 wherein the NFV requirements indicate an NFV memory block and wherein wirelessly exchanging the data over the LTE network comprises wirelessly exchanging the data using on the NFV memory block.

8. The method of claim 1 further comprising determining at least one trusted LTE eNodeB and wherein wirelessly attaching to the LTE network comprises attaching to at least one trusted LTE eNodeB responsive to the enhanced communication requirement.

9. The method of claim 1 further comprising determining at least one trusted LTE carrier frequency and wherein wirelessly attaching to the LTE network comprises attaching using the at least one trusted LTE carrier frequency responsive to the enhanced communication requirement.

10. The method of claim 1 further comprising determining trusted LTE subcarrier frequencies and wherein wirelessly attaching to the LTE network comprises attaching using the trusted LTE subcarrier frequencies responsive to the enhanced communication requirement.

11. A Long Term Evolution (LTE) User Equipment (UE) comprising:
a data processing system configured to determine an enhanced communication requirement, and in response, to determine one or more Network Function Virtualization (NFV) requirements for an LTE network;
a wireless transceiver configured to wirelessly attach to the LTE network and wirelessly transfer a first Non-Access Stratum (NAS) file indicating the NFV requirements to the LTE network;
the wireless transceiver configured to receive a second NAS file from the LTE network;
the data processing system configured to process the second NAS file to determine if the LTE network can service the NFV requirements and to direct the wireless transceiver to wirelessly exchange data over the LTE network if the LTE network can service the NFV requirements.

12. The LTE UE of claim 11 wherein the wireless transceiver configured to wirelessly attach to the LTE network comprises the wireless transceiver configured to transfer an establishment cause indicating that the NAS file will indicate the NFV requirements.

13. The LTE UE of claim 11 wherein the NFV requirements indicate an NFV Access Point Name (APN) and wherein the wireless transceiver configured to wirelessly exchange the data over the LTE network comprises the wireless transceiver configured to wirelessly exchange the data using on the NFV APN.

14. The LTE UE of claim 11 wherein the NFV requirements indicate an NFV data center and wherein the wireless transceiver configured to wirelessly exchange the data over the LTE network comprises the wireless transceiver configured to wirelessly exchange the data using on the NFV data center.

15. The LTE UE of claim 11 wherein the NFV requirements indicate an NFV server blade and wherein the wireless transceiver configured to wirelessly exchange the data over the LTE network comprises the wireless transceiver configured to wirelessly exchange the data using on the NFV server blade.

16. The LTE UE of claim 11 wherein the NFV requirements indicate an NFV time slice and wherein the wireless transceiver configured to wirelessly exchange the data over the LTE network comprises wireless transceiver configured to wirelessly exchange the data using on the NFV time slice.

17. The LTE UE of claim 11 wherein the NFV requirements indicate an NFV memory block and wherein the wireless transceiver configured to wirelessly exchange the data over the LTE network comprises the wireless transceiver configured to wirelessly exchange the data using on the NFV memory block.

18. The LTE UE of claim 11 further comprising the data processing system configured to determine at least one trusted LTE eNodeB and wherein the wireless transceiver configured to wirelessly attach to the LTE network comprises the wireless transceiver configured to attach to at least one trusted LTE eNodeB responsive to the enhanced communication requirement.

19. The LTE UE of claim 11 further comprising the data processing system configured to determine at least one trusted LTE carrier frequency and wherein the wireless transceiver configured to wirelessly attach to the LTE network comprises the wireless transceiver configured to attach using the at least one trusted LTE carrier frequency responsive to the enhanced communication requirement.

20. The LTE UE of claim 11 further comprising the data processing system configured to determine trusted LTE subcarrier frequencies and wherein the wireless transceiver configured to wirelessly attach to the LTE network comprises the wireless transceiver configured to attach using the trusted LTE subcarrier frequencies responsive to the enhanced communication requirement.

* * * * *